United States Patent [19]

Gosset et al.

[11] Patent Number: 5,421,838
[45] Date of Patent: Jun. 6, 1995

[54] BINDING COMPOSITION FOR THE PREPARATION OF A NOVEL AGGLOMERATE BASED ON FINELY DIVIDED MATERIALS, PROCESS USING THE SAID COMPOSITION AND THUS OBTAINED AGGLOMERATE

[75] Inventors: Serge Gosset, Lestrem; Jean-Pierre Graux, Lillers, both of France

[73] Assignee: Roquette Freres, Lestrem, France

[21] Appl. No.: 300,211

[22] Filed: Aug. 18, 1994

Related U.S. Application Data

[63] Continuation of Ser. No. 32,273, Mar. 17, 1993, abandoned.

[30] Foreign Application Priority Data

Mar. 20, 1992 [FR] France ................................ 92 03393

[51] Int. Cl.$^6$ .............................................. C10L 5/10
[52] U.S. Cl. ........................................ 44/577; 106/210
[58] Field of Search ................. 44/550, 551, 554, 560, 44/577; C10L 5/10, 5/12, 5/14; 106/210

[56] References Cited

U.S. PATENT DOCUMENTS 2,247,026  1/1939  Johnson.
3,726,652  11/1970  Schick.
5,009,671  4/1991  Franke et al. ......................... 44/598

FOREIGN PATENT DOCUMENTS 2227024  7/1990  United Kingdom.
2234257  1/1991  United Kingdom.

OTHER PUBLICATIONS

Chemical Abstracts, vol. 109, 1988, abstract No. 175299a.

*Primary Examiner*—Prince Willis, Jr.
*Assistant Examiner*—Cephia D. Toomer
*Attorney, Agent, or Firm*—Larson & Taylor

[57] ABSTRACT

A binding composition for the preparation of agglomerates based on finely divided materials, which puts into the presence of one another an amylaceous compound and ammonium chloride.

9 Claims, No Drawings

BINDING COMPOSITION FOR THE PREPARATION OF A NOVEL AGGLOMERATE BASED ON FINELY DIVIDED MATERIALS, PROCESS USING THE SAID COMPOSITION AND THUS OBTAINED AGGLOMERATE

This application is a continuation of application Ser. No. 08/032,273, filed Mar. 17, 1993, now abandoned.

The invention relates to a binding composition for the preparation of a new agglomerate based on finely divided materials.

It is also relates to a process using the said composition as well as the thus obtained agglomerate.

The expression "agglomerate based on finely divided materials" denotes any physical presentation of materials, possibly fuel materials, which are finely divided, easily handled and useful for domestic or industrial purposes. By way of example may be mentioned balls, briquets and pellets.

The finely divided materials concerned by the present invention, when they are fuel materials, are selected from the substances rich in carbon, such as for example coal fines or dusts, wood charcoal fines, coal coke fines, petroleum coke fines, vegetable wastes fines or the mixtures of these products. These materials and especially the coal fines and dusts are produced in big quantities by modern extraction processes and washing processes, especially of coal.

These finely divided materials, when they are not fuel materials, can be selected especially from the group comprising ore fines, sedimentary rocks fines such as sands, fines of the slag type or cinder, the fines resulting from the manufacture of glass and mixtures of these products.

It is also possible to mix at least one fuel material with at least one non-fuel material.

Various agglomeration techniques of these finely divided materials, generally employing additives or binders suitable for ensuring a sufficient cohesion or strength of the thus obtained agglomerates, have already been proposed.

Among these additives or binders the most currently employed, it is possible to mention pitch from coal, from wood or from petroleum, bitumen, lignosulphonates, clays, polysaccharides among which in particular are starches and starch derivatives.

The most used of these binders is incontestably coal pitch, but the requirements with respect to protection of the environment becoming more and more strict, its use today shows a certain recession.

In fact, its use makes it necessary to submit the agglomerates thus obtained to a heat treatment or fume reduction treatment in order to lower the concentration of phenolic compounds. Now, this treatment results in a non negligible atmospheric pollution. Moreover, the fume reduction treatment not being complete, the combustion of these agglomerates at the time of their use causes a release of smoke noxious to man.

These drawbacks have led certain countries to forbid their use.

The drawbacks inherent in the use of pitch are found again in the employment of bitumen as a binder.

In order to overcome these drawbacks, it has been proposed to resort, as a binder, to lignosulphonates, especially of ammonium.

To overcome the numerous well-known drawbacks of lignosulphonates (in particular the low "green strength" of the agglomerates containing them, the occurrence of a high rate of cinders or ashes, the important sulfur content), it has been proposed to resort, as a binder, to starch which, used alone or in mixture with other binders, as taught for example by the patents U.S. Pat. No. 3,726,652 and DE 3 227 395, shows many advantages; it leads to good results with respect to:
the mechanical compressive strength,
the abrasion resistance,
the impact resistance,
and may be used without limitation in industrial plants initially designed for use with pitch or with bitumen which are the binders most used at present, its employment hence not necessitating an additional investment; in addition, plant maintenance is reduced.

Furthermore, the combustion of the starch-bonded agglomerates does not generate a toxic and/or polluting smoke.

However, and this constitutes a major drawback, starch based agglomerates show a very marked sensitivity to water, rendering their storage in the open air impossible.

It has been proposed, to overcome this drawback, to associate the starch with pitch, with asphalt or with bitumen or again to insolubilize the starch with resins of the urea-formaldehyde, phenol-formaldehyde, melamine-formaldehyde, ketone-formaldehyde type or their mixture, but all these solutions reintroduce the problem of release of toxic and polluting fumes during the combustion of the thus obtained agglomerates.

A decisive improvement has been brought by the Applicants' patent FR-A-89 07679 according to which recourse is made to a binding composition essentially comprising starch and an oxidizing agent especially consisting of a persulfphate.

The thus obtained agglomerates no longer show the drawbacks of those prepared starting from binding compositions different from starch based compositions and correspond in a fully satisfying manner the two first of the three following fundamental requirements of practice, i.e.:
the green strength,
the mechanical compressive strength and
the water resistance,
but their water resistance, which is satisfactory, remains improvable especially with respect to agglomerates which are located in the lower part of piles or heaps stored in an environment with high water retention.

According to further attempts to provide the best simultaneous response to the three above-mentioned requirements of the practice, molasses were proposed as binders.

These attempts are especially disclosed by
the English Patent GB-A-2 227 024 and
the French Patent FR-A-90 09028.

In both cases, the binding composition as used comprises simultaneously a molasse and an ammonium salt which is consisting, as far as the tests carried out are concerned,
of ammonium sulphate or phosphate, according to the English patent, ammonium chloride being considered as little advantageous due to its bad performances recorded with respect to green strength,
of lignosulphonate and/or nitrate, according to the French patent.

The tests performed by the Applicants have shown that the mechanical compressive strength as far as the resistance to water obtained with a binding composition based on molasses and on one of these ammonium salts, i.e. phosphate, sulphate, lignosulphonate and nitrate, remain improvable, the chloride being left out for the hereabove described reasons.

The Applicants' object was therefore to provide a binding composition which, while leading to agglomerates of the kind in question at least equivalent, as far as the green strength and the mechanical compressive strength are concerned, to those which can be obtained according to the teaching of the French Patent FR-A-89 07679, permit the obtention of agglomerates whose water resistance is improved.

And the Applicants have had the merit of having found that this result is absolutely surprisingly and unexpectedly obtained as soon as there is used for the preparation of the binding composition, on the one hand, an amylaceous compound, more especially starches and their derivatives and, on the other hand, ammonium chloride.

This result is all the more unexpected as, while those skilled in the art could expect that the replacement of molasses by starch would improve the green strength of the thus obtained agglomerates whatever the anion used, they had no possibility to forecast that this improvement would correspond, in the case of the chloride, to a factor of about 15 while it corresponds to a factor of about less than 2 to about 5 in the case of the phosphate and sulphate, the chloride being thus much more efficient despite the fact that according to the prior art it was left out, and that, at the same time, the mechanical compressive strength and the water resistance obtained when using ammonium chloride, would also be improved not only with respect to sulphate and to phosphate, but also with respect to lignosulphonate and to nitrate.

Consequently, the binding composition according to the invention for the preparation of a new agglomerate based on finely divided materials, is characterized by the fact that it puts into the presence of one another
an amylaceous compound and
ammonium chloride.

In practice, it is possible that the constitutive elements of the binding composition, i.e. the amylaceous compound one the one hand, and the ammonium chloride on the other hand, are put in presence of one another only at the moment of the constitution of the agglomerate; it is also possible that they are available under the form of a commercial product comprising the totality or a part of the two constituents.

The process according to the invention, which comprises successively:
a step wherein a finely divided material is mixed with the constitutive elements of a binding composition and with a sufficient amount of water,
a step wherein the above mixture is agglomerated, leading thus to the formation of an agglomerate, and
a step consisting of a thermic treatment of the agglomerate,
is characterized by the fact that the constitutive elements of the binding composition comprise, on the one hand, an amylaceous compound, especially a starch or one of its derivatives and, on the other hand, ammonium chloride.

From a practical standpoint of view, the mixture of the finely divided material with the constituents of the binding composition and with the water, can be prepared according to a variable succession of steps with possibly use of heat, in particular in the case wherein the amylaceous compound is consisting of a starch under granular form. Furthermore, the ammonium chloride can be introduced only into one of the other constituents of the mixture or distributed into several of the said constituents or within each of them.

Finally, it is possible to contemplate to form the ammonium chloride in situ by introduction, during the mixture step, of equimolecular quantities of chlorhydric acid and of ammonia.

According to an advantageous embodiment of the process according to the invention, the constitutive elements of the binding composition are introduced at the moment of the mixture step in proportions which are, with respect to the finely divided material,
from 0.5 to 25%, preferably from 1 to 15% and, still more preferably, from 2 to 7% by weight as far as the amylaceous compound is concerned,
from 0.1 to 10%, preferably from 0.25 to 5% and, still more preferably, from 0.5 to 3% by weight as far as the ammonium chloride is concerned, and
from 3 to 15% by weight as far as the water is concerned.

According to an advantageous embodiment of the binding composition according to the invention, the amylaceous compound is selected from the group comprising crushed cereals, flours, starches, derivatives of starch or their mixtures, starches and their derivatives being preferred.

The abovesaid starches or derivatives of starch are selected
as far as the starches are concerned, from the group comprising native starches of any origin, for example from potato, from manioc, from corn, from waxy maize, from wheat,
as far as the derivatives of starch are concerned, from the group comprising starches modified physically and/or chemically.

The amylaceous compound, provided that it consists of a starch or of a starch derivative, may be in granular form or in the form of glue, or still in the pregelatinized form.

The ammonium chloride can be used in powder form in order to be mixed with the finely divided material and/or with the amylaceous compound and/or with the water and/or with a mixture of these constituents.

Still from the practical point of view and especially when the amylaceous compound is consisting of a starch or a starch derivative, the steps of the process according to the invention comprise:
forming the mixture of the finely divided material, of the starch, of $NH_4Cl$ and of water inside a mixing device under heat, bringing thus the temperature of the mixture to a value comprised between 80° and 100° C.,
transporting the thus obtained mixture through a device adapted to produce pellets, and
subjecting the said pellets to a thermic treatment consisting in maintaining them at a temperature from 200° to 300° C. during 180 to 30 minutes.

Advantageously, the agglomerating step is carried out by way of one of the techniques selected from the group comprising pelleting, pressure-compacting, granulating, extrusion and moulding (cf. for example the European Patent EP 0 097 486).

It is possible to carry out the thermic treatment under an atmosphere comprising nitrogen, carbon dioxide, water vapor, oxygen, or still a mixture of two or several of these products. The thermic treatment must be so that the temperature does not exceed the carbonization temperature of the sugars.

The new agglomerate according to the invention, which is essentially free of pitch and/or of bitumen, is characterized by the fact that it presents before the thermic treatment, a green strength of at least 50 Newtons (N), after the thermic treatment, a mechanical compressive strength of at least 1000 N and a water resistance at normal temperature such that, after a four weeks stay in water, the mechanical compressive strength is equal to at least 80% of the initial mechanical compressive strength, these figures being determined by way of a compressiometer and for an agglomeration pressure of 30000 N.

According to an advantageous embodiment, it is possible to incorporate to the agglomerate an agent making water repellent selected from the group of the organosilicic compounds in order to decrease the water regain by these agglomerates.

According to another advantageous embodiment, it is also possible to incorporate an agent improving the resistance of the said agglomerate against fire such as, for example, a compound of the family comprising phosphates, lime or calcium carbonate.

The invention will be still better comprised by way of the non limiting and partially comparative examples which follow and wherein advantageous embodiments of the invention are disclosed.

EXAMPLE 1

In a mixing device of the type "LANG", there is introduced on the one hand an amount of 1 kg of coal fines (anthracite) whose granulometry is lower than 2 mm, on the other hand an amount of 50 g of native maize starch and an amount of 50 g of water. While maintaining stirring, the thus obtained mixture is heated with live steam until 90° C. This mixture is mingled during about 15 minutes, the temperature being maintained at 90° C. and the humidity being of 8%.

The mixture is then agglomerated on a piston press equipped with a spherical pressure cell whose diameter is 5 cm. The force applied to the piston is adjusted to 30000 N.

There are thus obtained coal fines pellets having a green strength equal to 80 N determined by way of a compressiometer PERRIER, said green strength being sufficient to enable the pellets to be transported.

These pellets are then subjected to an oven drying at 220° C. during 2 hours.

The mechanical compressive strength of the said pellets, determined in the same manner as the green strength, is equal to 800 N.

The pellets are then immersed in cold water. It is noticed that the said pellets desagregate quickly. One hour after immersion, the agglomerate has no longer any cohesion.

These results show that it is possible, when using an amylaceous binder, to produce agglomerates starting from coal fines which have satisfying mechanical characteristics but which are not water resisting.

EXAMPLES 2 to 6

In the five experiences which correspond respectively to examples 2 to 6, there were tested five types of agglomerates prepared along the conditions hereabove recalled and which are identical, except the nature of the ammonium salt.

In example 2 according to the invention, the ammonium salt is the chloride and, in the comparative examples 3 to 6, the said salt is respectively consisting of sulphate, phosphate, nitrate and lignosulphonate.

The conditions of the preparation and the measures or determinations as effected are as follows.

In a mixing device identical to the device identified in example 1, there are introduced an amount of 1 kg of coal fines, an amount of 50 g of native corn starch and an amount of 10 g of ammonium salt dissolved in 30 cl of water. The mixture is stirred and heated under the same conditions as in example 1.

The mixture is agglomerated as disclosed in example 1.

Pellets of coal fines are obtained whose green strength is determined.

Then the said pellets are subjected to an oven drying identical to the oven drying of example 1.

After the oven drying, the mechanical compressive strength is determined.

Then, the pellets are immersed in cold water.

Their mechanical compressive strength is again determined first after 48 hours of immersion, then after 1 week of immersion and finally after 1 month of immersion.

The results of these determinations are recorded in Table I.

TABLE I

| Anion of the ammonium salt | Example 2 Chloride | Example 3 Sulphate | Example 4 Phosphate | Example 5 Nitrate | Example 6 Ligno-sulphonate |
| --- | --- | --- | --- | --- | --- |
| Green strength | 160 N | 100 N | 50 N | 30 N | 30 N |
| Mechanical compressive strength before immersion | 1500 N | 800 N | 600 N | 320 N | 700 N |
| Mechanical compressive strength after 48 h of immersion | 1400 N | 550 N | 450 N | 300 N | 500 N |
| Mechanical compressive strength after 1 week of immersion | 1350 N | 500 N | 300 N | 100 N | 350 N |
| Mechanical compressive strength after 1 month of immersion | 1300 N | 500 N | 300 N | 0 | 300 N |

From the results recorded in Table I, it appears that a binding composition wherein there are in presence of one another native starch (5% by weight with respect to the finely divided material) and ammonium chloride (1% by weight with respect to the finely divided material), enables the obtention of pellets presenting
a very good green strength,
an excellent mechanical compressive strength and
an excellent resistance to water.

It is to be noticed that the mechanical compressive strength of these pellets decreases very few by relative value after having been immersed in water while that result is not obtained when an other ammonium salt is used, this other ammonium salt being sulphate, phosphate, nitrate or lignosulphonate.

EXAMPLE 7

Along the same procedure as previously, an amount of 30 g of ammonium chloride dissolved in 30 cl of water is used instead of an amount of 10 g of ammonium chloride dissolved in 30 cl of water, the other conditions being unchanged.

Pellets of coal fines are obtained having a green strength equal to 160 N.

After the thermic treatment under the conditions of example 1, the mechanical compressive strength is 1400 N.

The thus obtained pellets are then immersed in cold water. No degradation is noticed after one month of immersion.

Furthermore, the mechanical compressive strength is still equal to 1400 N after one month of immersion.

This example shows that the increase of the proportion of ammonium chloride provides a better preservation of mechanical compressive strength after immersion.

EXAMPLE 8

In a mixing device of the "LANG" type, there are introduced, on the one hand, an amount of 1 kg of coal fines and, on the other hand, an amount of 10 g of ammonium chloride in the form of powder. The mixture is homogenized and then there is injected an amount of 143 g of a glue containing 35% of waxy maize starch obtained on a "Jet-cooker" at 100° C.

The mixture is mingled during 15 minutes, the temperature being maintained at 100° C. by way of a heating system comprising a hot water jacket.

The mixture is compacted in the same way as in example 1.

Pellets of coal fines are obtained and present a green strength equal to 60 N.

These pellets are subjected to the thermic treatment disclosed in example 1.

The mechanical compressive strength of these pellets, after the thermic treatment, determined under the same conditions as in example 1, is equal to 1600 N.

After one month immersion in cold water, no desagregation is noticed.

Furthermore, the development of the mechanical compressive strength after immersion is minor as after having reached the value of 1500 N after 48 hours of immersion, the said mechanical compressive strength remains unchanged after one month of immersion.

The use of a glue permits the use of the installations previously used for liquid binders such as lignosulphonates, molasses and others, without any modification of the installation.

We claim:

1. Binding composition for the preparation of agglomerates based on finely divided materials selected from the group consisting of fuel materials, ore fines, sedimentary rock fines, fines resulting from the manufacture of glass and the mixtures thereof, comprising as constitutive elements:
    an amylaceous compound selected from the group consisting of starch and its derivatives in a proportion from 0.5 to 25% by weight with respect to the finely divided material and
    ammonium chloride in a proportion from 0.1 to 10% by weight with respect to the finely divided material.

2. Process for the preparation of agglomerates based on a finely divided material selected from the group consisting of fuel materials, ore fines, sedimentary rock fines, fines resulting from the manufacture of glass and the mixtures thereof, successively comprising:
    forming a mixture by mixing the finely divided material with water and with a binding composition comprising:
        an amylaceous compound selected from the group consisting of starch and its derivatives in a proportion from 0.5 to 25% by weight with respect to the finely divided material and
        ammonium chloride in a proportion from 0.1 to 10% by weight with respect to the finely divided material,
    forming an agglomerate by agglomerating the abovesaid mixture, and
    subjecting the thus-obtained agglomerate to a thermic treatment.

3. Process for the preparation of agglomerates based on a finely divided material selected from the group consisting of fuel materials, ore fines, sedimentary rock fines, fines resulting from the manufacture of glass and the mixtures thereof, successively comprising:
    forming a mixture by mixing the finely divided material with a proportion from 0.5 to 25% by weight with respect to the finely divided material of an amylaceous compound selected from the group consisting of starch and its derivatives, with a proportion from 0.1 to 10% by weight with respect to the finely divided material of ammonium chloride and with a proportion from 3 to 15% by weight with respect to the finely divided material of water,
    forming an agglomerate by agglomerating the abovesaid mixture, and
    subjecting the thus-obtained agglomerate to a thermic treatment.

4. Process according to claim 2, wherein the thermic treatment comprises maintaining the agglomerate at a temperature from 200° to 300° C. for 180 to 30 minutes.

5. Process according to claim 3, wherein with respect to the finely divided material:
    the proportion of amylaceous compound is from 1 to 15% by weight,
    the proportion of ammonium chloride is from 0.25 to 5% by weight, and
    the proportion of water is from 3 to 15% by weight.

6. Process according to claim 3, wherein with respect to the finely divided material:
    the proportion of amylaceous compound is from 2 to 7% by weight,
    the proportion of ammonium chloride is from 0.5 to 3% by weight, and
    the proportion of water is from 3 to 15% by weight.

7. Process according to claim 3, wherein the thermic treatment comprises maintaining the agglomerate at a temperature of from 200° to 300° C. for 180 to 30 minutes.

8. Agglomerate based on a finely divided material selected from the group consisting of fuel materials, ore-fines, sedimentary rock fines, fines resulting from the manufacture of glass and the mixtures thereof, and essentially free of pitch and/or of bitumen, obtainable by forming a mixture comprising the finely divided material, water and a binding composition comprising:
an amylaceous compound selected from the group consisting of starch and its derivatives in a proportion from 0.5 to 25% by weight with respect to the finely divided material and
ammonium chloride in a proportion from 0.1 to 10% by weight with respect to the finely divided material,
forming an agglomerate by agglomerating the abovesaid mixture, and
subjecting the thus-obtained agglomerate to a thermic treatment,
the said agglomerate having:
before the thermic treatment, a green strength of at least 50 Newtons (N), and
after the thermic treatment, a mechanical compressive strength of at least 1000N and a water resistance such that, after a four week stay in cold water, the mechanical comprehensive strength is equal to at least 80% of the initial mechanical compressive strength.

9. Agglomerate according to claim 8, wherein the thermic treatment comprises maintaining the agglomerate at a temperature of from 200° to 300° C. for 180 to 30 minutes.

* * * * *